(12) United States Patent
Masawaki

(10) Patent No.: US 6,756,413 B2
(45) Date of Patent: Jun. 29, 2004

(54) O/W AQUEOUS THERMOSETTING RESIN DISPERSION, FRP PRECISION FILTER MEDIUM MADE WITH THE AQUEOUS DISPERSION, AND PROCESS FOR PRODUCING THE SAME

(75) Inventor: Keizo Masawaki, Hiratsuka (JP)

(73) Assignee: Japan U-PICA Company, Ltd., Tokyo (JP)

( * ) Notice: Subject to any disclaimer, the term of this patent is extended or adjusted under 35 U.S.C. 154(b) by 0 days.

(21) Appl. No.: 10/203,418

(22) PCT Filed: Dec. 14, 2001

(86) PCT No.: PCT/JP01/10982

§ 371 (c)(1),
(2), (4) Date: Aug. 8, 2002

(87) PCT Pub. No.: WO02/48225

PCT Pub. Date: Jun. 20, 2002

(65) Prior Publication Data

US 2003/0022954 A1 Jan. 30, 2003

(30) Foreign Application Priority Data

Dec. 15, 2000 (JP) .......................... 2000-382057
Dec. 15, 2000 (JP) .......................... 2000-382058
Jul. 12, 2001 (JP) .......................... 2001-211934

(51) Int. Cl.[7] .......................... C08J 9/232; C08J 9/24; C08J 9/28
(52) U.S. Cl. .......................... 521/64; 521/59; 521/65
(58) Field of Search .......................... 521/64, 65, 59

(56) References Cited

U.S. PATENT DOCUMENTS 3,255,127 A * 6/1966 von Bonin et al.
RE27,444 E * 7/1972 Will
3,822,224 A * 7/1974 Gillan et al.
4,459,379 A    7/1984 Schwarz
4,461,848 A * 7/1984 Lawson et al.
4,461,849 A * 7/1984 Karickhoff
4,483,945 A * 11/1984 Beresford et al.

FOREIGN PATENT DOCUMENTS

| JP | 50-133238 | 10/1975 |
| JP | 01-275636 | 11/1989 |
| JP | 02-150457 | 6/1990 |
| JP | 03-014864 | 1/1991 |
| JP | 08-188666 | 7/1996 |
| JP | 11-012384 | 1/1999 |
| JP | 2000-159847 | 6/2000 |

* cited by examiner

Primary Examiner—Morton Foelak
(74) Attorney, Agent, or Firm—Sherman & Shalloway

(57) ABSTRACT

The present invention relates to an O/W type aqueous dispersion which comprises mixing a radical polymerization type thermosetting resin and water together to uniformly disperse particles of the resin in the aqueous phase; the aqueous dispersion is stable and thixotropic and has excellent workability; moreover, as with a normal radical polymerization type thermosetting resin, the aqueous dispersion can be cured at ambient temperature or with heating in the presence of a curing agent and if necessary an accelerator, and the cured material obtained is a porous cured material having fine particles bound together and fine interconnected pores between the bound particles. Moreover, the present invention also relates to an FRP precision filter medium that comprises a cured material that is obtained by curing the above-mentioned O/W type aqueous dispersion in the presence of a reinforcing material, the cured material being a porous cured material that comprises a particle aggregate that contains the reinforcing material and has approximately spherical fine particles bound together therein, has communicating voids between the bound particles, and has fine interconnected pores having an effective pore diameter of 0.1 to 1.0 μm and a porosity of 10 to 40 vol %.

8 Claims, 1 Drawing Sheet

O/W AQUEOUS THERMOSETTING RESIN DISPERSION, FRP PRECISION FILTER MEDIUM MADE WITH THE AQUEOUS DISPERSION, AND PROCESS FOR PRODUCING THE SAME

TECHNICAL FIELD

The present invention relates to an O/W type aqueous thermosetting resin dispersion which comprises mixing a liquid radical polymerization type thermosetting resin and water together to disperse particles of the resin in the aqueous phase. Moreover, the present invention also relates to an FRP precision filter medium comprising a porous cured material that is obtained by curing the above-mentioned O/W type aqueous thermosetting resin dispersion in the presence of a reinforcing material and which has approximately spherical fine particles bound together therein and communicating voids between the bound particles, and a manufacturing method thereof.

BACKGROUND ART

Regarding aqueous dispersions obtained by mixing a radical polymerization type thermosetting resin such as an unsaturated polyester resin or an epoxy acrylate resin and water together and carrying out dispersion, conventionally ones in which water droplets are dispersed in the resin, i.e. W/O emulsion type aqueous thermosetting resin dispersions, are known, and indeed are commercially sold. Such conventional W/O emulsion type aqueous thermosetting resin dispersions are used as one method of incorporating moisture into a resin to make the resin fire-resistant, and are also used as means of suppressing cure shrinkage of unsaturated polyester resins and epoxy acrylate resins.

Moreover, regarding aqueous dispersions obtained by mixing a radical polymerization type thermosetting resin such as an unsaturated polyester resin and water together and thus dispersing particles of the resin in the aqueous phase, due to the belief that the binding between the resin particles will be poor and hence it will not be possible to obtain a cured material having a mechanical strength sufficient to withstand practical use, up until now there have been virtually no studies carried out on O/W type aqueous dispersions obtained by mixing a radical polymerization type thermosetting resin such as an unsaturated polyester resin and water together and carrying out dispersion.

The present inventors carried out a multitude of studies on radical polymerization type thermosetting resins such as unsaturated polyester resins, epoxy acrylate resins and urethane acrylate resins, and as a result discovered O/W type aqueous dispersions obtained by mixing a radical polymerization type thermosetting resin and water together to uniformly disperse particles of the resin in the aqueous phase. It was also discovered that such an aqueous dispersion is stable and thixotropic and has excellent workability, and moreover that the aqueous dispersion can be cured at ambient temperature or with heating as with a conventional radical polymerization type thermosetting resin, and the cured material obtained has fine interconnected pores and is able to withstand practical use.

That is, the O/W type aqueous thermosetting resin dispersion of the present invention can easily be cured at ambient temperature or with heating by adding a curing agent and if necessary an accelerator, and a porous cured material having fine interconnected pores can be obtained; this porous cured material, if treated to increase the functionality, can be used in various applications, for example as a precision filter medium, or as an absorbent/adsorbent, or as a carrier.

Conventionally, organic films, hollow fibers, ceramics, metal films and so on are known and are commercially sold as precision filter medium for sewage treatment. However, organic films must be assembled in a cell for filtration, and hence there are drawbacks such as there being a cost to manufacture the cell and the durability of the cell being poor. Hollow fibers have the advantage of being small and light, but are expensive. Ceramics are inexpensive as materials, but have the drawbacks of being heavy and the size becoming large. Metal films can be freely shaped and have durability in terms of strength, but have the drawbacks of being expensive and of the durability worsening through corrosion, and hence the current state of affairs is that they are not widespread on the market.

Consequently, based on the realization that up until now it has not been possible to obtain a cured material able to withstand practical use, it is an object of the present invention to provide a stable O/W type aqueous thermosetting resin dispersion comprising an aqueous dispersion obtained by mixing a radical polymerization type thermosetting resin and water together to uniformly disperse particles of the resin in the aqueous phase, this being a type of aqueous dispersion that has hardly been studied hitherto.

Moreover, it is an object of the present invention to provide a precision filter medium, which comprises a porous cured material obtained by curing the O/W type aqueous thermosetting resin dispersion in the presence of a reinforcing material, is light and durable, can be freely shaped, and is satisfactory in terms of cost, as well as a method of manufacturing the precision filter medium.

DISCLOSURE OF THE INVENTION

The present invention relates to an O/W type aqueous dispersion which comprises mixing a radical polymerization type thermosetting resin, for example a radical polymerization type thermosetting resin such as an unsaturated polyester resin, an epoxy acrylate resin or a urethane acrylate resin, and water together and carrying out dispersion so that particles of the resin are uniformly dispersed in the aqueous phase; the aqueous dispersion is stable and thixotropic and has excellent workability; moreover, as with a normal radical polymerization type thermosetting resin, the aqueous dispersion can be cured at ambient temperature or with heating by adding a curing agent and if necessary an accelerator, and the cured material obtained is a porous cured material having fine interconnected pores that can withstand practical use.

Moreover, the cured material is light, and the majority of the fine interconnected pores in the cured material have a pore diameter in a range of 0.1 to 1.0 μm, with there being hardly any pores that colon bacilli of size 1 μm or more will pass through, and hence it was found that the cured material is suitable for precision filtration. It was ascertained that a cured material obtained by curing the aqueous dispersion in the presence of a reinforcing material has sufficient strength, and can be used as a precision filter medium having excellent durability; moreover, because an aqueous dispersion of a radical polymerization type thermosetting resin is used, there is freedom in the molding, and hence molded articles of various shapes can easily be obtained, and thus problems of conventional precision filter media can be resolved all at once.

Specifically, the present invention relates to: (1) an O/W type aqueous thermosetting resin dispersion which comprises mixing a liquid radical polymerization type thermosetting resin and water together in a weight ratio in a range of 90:10 to 60:40 to uniformly disperse particles of the resin in the aqueous phase; (2) the O/W type aqueous thermosetting resin dispersion of (1) above, wherein the liquid radical polymerization type thermosetting resin comprises at least one selected from liquid unsaturated polyester resins, liquid epoxy (meth)acrylate resins, liquid urethane (meth)acrylate resins and liquid (meth)acrylic resins; (3) as above, wherein the liquid radical polymerization type thermosetting resin is a liquid radical polymerization type thermosetting resin containing a curing agent; and (4) as above, wherein the liquid radical polymerization type thermosetting resin is a liquid radical polymerization type thermosetting resin containing a curing agent and an accelerator.

Moreover, the present invention relates to: (5) an FRP precision filter medium, characterized by comprising a porous cured material, which is obtained by curing an O/W type aqueous dispersion comprising a liquid radical polymerization type thermosetting resin in the presence of a reinforcing material, has approximately spherical fine particles bound together therein and communicating voids between the bound particles, and has fine interconnected pores having an effective pore diameter of 0.1 μm to 1.0 μm and a porosity of 10 to 40 vol %.

Furthermore, the present invention relates to: (6) a method of manufacturing an FRP precision filter medium, characterized by comprising a porous cured material having fine interconnected pores having an effective pore diameter of 0.1 μm to 1.0 μm and a porosity of 10 to 40 vol %, which is obtained by curing, at ambient temperature or with heating, in the presence of a reinforcing material, an O/W type aqueous thermosetting resin dispersion that has been obtained by mixing a liquid radical polymerization type thermosetting resin and water together in a weight ratio in a range of 90:10 to 60:40 to uniformly disperse particles of the resin in the aqueous phase, and then removing water and drying at ambient temperature or with heating.

BEST MODE FOR CARRYING OUT THE INVENTION

Figure 1:
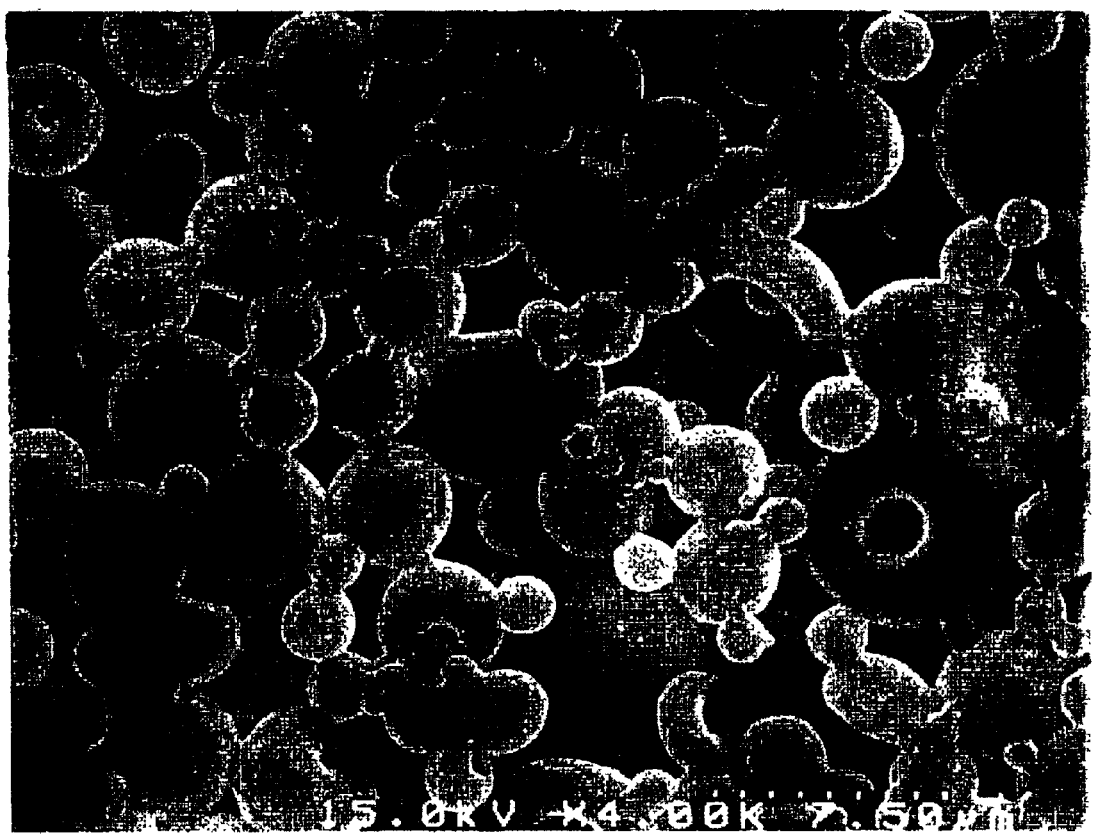
FIG. 1 is a photomicrograph of a cured material obtained by curing an O/W type aqueous thermosetting resin dispersion of the present invention. The photomicrograph shows that the cured material obtained from the O/W type aqueous dispersion is a porous material in which a particle aggregate comprising approximately spherical fine particles bound together is formed, and pores comprising interconnected voids between the fine particles are formed.

The O/W type aqueous thermosetting resin dispersion of the present invention is an O/W type (oil-in-water type) aqueous dispersion obtained by mixing together a liquid radical polymerization type thermosetting resin and water using mechanical means, thus uniformly dispersing particles of the resin in the aqueous phase. The O/W type aqueous thermosetting resin dispersion (hereinafter sometimes referred to simply as 'the O/W type aqueous dispersion') of the present invention is such that a cured material thereof can easily be obtained by adding a curing agent generally used with conventional liquid radical polymerization type thermosetting resins and if necessary an accelerator, and curing at ambient temperature or with heating.

The O/W type aqueous dispersion of the present invention is an aqueous dispersion in which fine resin particles are uniformly dispersed in an aqueous phase in a state surrounded by water; it is an O/W type aqueous dispersion in which the water forms a continuous phase (a so-called 'sea phase'), and the resin particles form a discontinuous phase (a so-called 'island phase'). Consequently, vaporization of a polymerizable monomer such as styrene having an ethylenic α, β-unsaturated double bond used as a crosslinking agent for the radical polymerization type thermosetting resin is suppressed, and hence there is a marked reduction in unpleasant styrene odor in the molding process and the curing process, i.e. the molding environment can be improved, and hence the O/W type aqueous dispersion of the present invention is excellent from the perspective of environmental health. Moreover, being an aqueous dispersion in which resin particles are dispersed in water, the O/W type aqueous dispersion of the present invention also has advantages such that washing with water is possible, with an organic solvent as conventionally not being required, and hence the working environment can be improved, and the molding work cost can be reduced.

A liquid unsaturated polyester resin, a liquid epoxy (meth)acrylate resin, a liquid urethane (meth)acrylate resin, or a liquid (meth)acrylic resin (a so-called 'acrylic syrup') is used as the liquid radical polymerization type thermosetting resin in the present invention,.

The liquid unsaturated polyester resin in the present invention is a liquid resin made by dissolving, in a polymerizable monomer having an ethylenic α,β-unsaturated double bond such as styrene, an unsaturated polyester obtained by condensation polymerization of a polyhydric alcohol such as a glycol as a main alcohol component thereof and an α,β-unsaturated dibasic acid and/or an anhydride thereof, and if necessary a saturated dibasic acid and/or an anhydride thereof.

Examples of the above-mentioned glycol include ethylene glycol, propylene glycol, diethylene glycol, dipropylene glycol, neopentyl glycol, 1,3-butanediol, 1,4-butanediol, 1,6-hexanediol, pentaerythritol, pentaerythritol derivatives such as pentaerythrite diallyl ether, allyl glycidyl ether, hydrogenated bisphenol A, bisphenol A, bisphenol A derivatives, and so on. These can be used singly, or two or more can be used mixed together.

Moreover, examples of the above-mentioned α,β-unsaturated dibasic acid and/or anhydride thereof include maleic acid or the anhydride thereof, fumaric acid, itaconic acid or the anhydride thereof, and so on. These can be used singly, or two or more can be used mixed together.

Examples of the saturated dibasic acid and/or anhydride thereof include phthalic anhydride, terephthalic acid, isophthalic acid, tetrahydrophthalic anhydride, methyltetrahydrophthalic anhydride, endomethylenetetrahydrophthalic anhydride, adipic acid, sebacic acid, tetrabromophthalic anhydride, het acid, hexahydrophthalic anhydride, 1,3-cyclohexanedicarboxylic acid, 1,4-cyclohexanedicarboxylic acid, and so on. These can be used singly, or two or more can be used mixed together.

Moreover, examples of the polymerization monomer having an ethylenic α,β-unsaturated double bond include vinyl monomers such as styrene, vinyltoluene, α-methylstyrene, vinyl acetate, methyl methacrylate and ethyl methacrylate, allyl monomers such as diallyl phthalate, diallyl isophthalate, triallyl isocyanurate and diallyl tetrabromophthalate, phenoxyethyl acrylate, 1,6-hexanediol acrylate, trimethylolpropane triacrylate, 2-hydroxyethyl acrylate, and so on. These can be used singly, or two or more can be used mixed together. Moreover, out of these, a vinyl monomer such as styrene or vinyltoluene is generally used.

Regarding the above-mentioned liquid unsaturated polyester resin, a commercially sold one can also be used. Examples of commercially sold liquid unsaturated polyester resins include 'FG-104' and 'GC-560' (trade names) made by Dainippon Ink and Chemicals, Inc., 'CR211' and 'RG22' (trade names) made by Mitsui Chemicals Co., Ltd., 'N-300' and 'G-226' (trade names) made by Nippon Shokubai Co., Ltd., '2260N' and 'RI-201' (trade names) made by Showa Highpolymer Co., Ltd., '5250' and '8408' (trade names) made by Takeda Chemical Industries, Ltd., 'U-PICA 6510' and '5602' (trade names) made by Japan U-PICA Co., Ltd., '2305' and '2620' (trade names) made by Hitachi Chemical Co., Ltd., and so on.

Moreover, regarding the liquid unsaturated polyester resin in the present invention, it is also possible to use a liquid unsaturated polyester resin that is obtained by dissolving, in a polymerizable monomer having an ethylenic $\alpha,\beta$-unsaturated double bond as described above, an unsaturated polyester manufactured using as part of the raw material thereof recovered PET, i.e. waste from high-molecular-weight polyethylene terephthalate products, for example waste such as used PET bottles, sheets and films, molding scrap, cutting scrap, and so on.

The liquid epoxy (meth)acrylate resin in the present invention is a liquid resin obtained by dissolving, in a polymerizable monomer having an ethylenic $\alpha,\beta$-unsaturated double bond, an epoxy (meth)acrylate resin having a (meth)acryloyl group at the end of the molecule thereof, which is obtained by an addition reaction between acrylic acid or methacrylic acid and an epoxy resin having at least 2 glycidyl ether groups per molecule. Examples of the epoxy resin having at least 2 glycidyl ether groups per molecule include bisphenol type epoxy resins derived from bisphenol A, bisphenol F, bisphenol S or the like or a derivative thereof, bixylenol type epoxy resins derived from bixylenol or a derivative thereof, biphenol type epoxy resins derived from biphenol or a derivative thereof, and naphthalene type epoxy resins derived from naphthalene or a derivative thereof, and also epoxy resins such as novolak type epoxy resins; these can be used singly, or two or more can be used mixed together. Regarding the polymerizable monomer having an ethylenic $\alpha,\beta$-unsaturated double bond, a polymerizable monomer like that used with the unsaturated polyester resin as described above can be used.

The liquid epoxy acrylate or epoxy methacrylate resin is a liquid resin obtained by dissolving an epoxy acrylate or epoxy methacrylate as described above in a liquid polymerizable monomer having an ethylenic a,-unsaturated double bond such as styrene or diethylene glycol dimethacrylate.

Regarding the above-mentioned liquid epoxy (meth) acrylate resin, a commercially sold one can also be used; examples include 'UE3505' and 'UE5210' (trade names) made by Dainippon Ink and Chemicals, Inc., 'H6700' and 'H8100' (trade names) made by Mitsui Chemicals Co., Ltd., 'RF1001' and 'RF1051' (trade names) made by Nippon Shokubai Co., Ltd., 'R-800' and 'H-600' (trade names) made by Showa Highpolymer Co., Ltd., 'P350' and 'P310' (trade names) made by Takeda Chemical Industries, Ltd., 'Neopol 8250' and '8411' (trade names) made by Japan U-PICA, '6120' and '6200' (trade names) made by Hitachi Chemical Co., Ltd., and so on.

Moreover, the liquid urethane (meth)acrylate resin in the present invention is a liquid resin obtained by dissolving, in a liquid polymerizable monomer such as styrene or diethylene glycol dimethacrylate, a urethane acrylate or urethane methacrylate having an acrylate or methacrylate double bond at the end of the molecule thereof, which is obtained by reacting a polyalcohol and/or a polyester polyol and/or a polyether polyol with a diisocyanate, introducing an isocyanate group on the end of the molecule, and reacting the isocyanate group with an acrylate or methacrylate having an alcoholic hydroxyl group, or by first reacting an acrylate or methacrylate having an alcoholic hydroxyl group with an isocyanate so as to leave behind the isocyanate group, and then reacting the isocyanate group with a polyalcohol and/or a polyester polyol and/or a polyether polyol. These can be used singly, or two or more can be used mixed together.

Regarding the liquid urethane (meth)acrylate resin, examples of commercially sold ones include 'U-PICA 8921', 'U-PICA 8940' and 'U-PICA 8932' (trade names) made by Japan U-PICA Co., Ltd., '8200' (trade name) made by Dainippon Ink and Chemicals, Inc., and so on.

Moreover, the liquid acrylic resin or methacrylic resin used in the present invention is a methyl methacrylate copolymer made by copolymerizing methyl methacrylate as a principal component and some of another polymerizable monomer, or a liquid resin made by dissolving such a copolymer in methyl methacrylate; this is usually referred to as an 'acrylic syrup', and examples include ones commercially sold by Mitsubishi Rayon Co., Ltd., NOF Corporation, Nippon Shokubai Co., Ltd., Kuraray Co., Ltd. and so on. Note that to make these liquid resins be thermosetting, they are used together with a polyfunctional methacrylate or acrylate type monomer such as ethylene glycol dimethacrylate or diethylene glycol dimethacrylate.

The O/W type aqueous dispersion of the present invention can easily be manufactured by mixing together a liquid radical polymerization type thermosetting resin (sometimes referred to simply as 'the liquid resin') and water using mechanical mixing means. Specifically, a stable O/W type aqueous dispersion can be obtained by adding a prescribed amount of water to the liquid radical polymerization type thermosetting resin to which has been added a curing agent and if necessary an accelerator, and then mixing using mechanical mixing means such as a dissolver (a high-speed rotating mixer) or a homomixer, or by irradiating with ultrasonic. The water used may be any of ion exchange water, distilled water or tap water.

The mixing ratio (resin:water) between the liquid radical polymerization type thermosetting resin and the water in the present invention is in a range of 90:10 to 60:40, preferably 85:15 to 70:30, as a weight ratio. If the mixing proportion of the water is greater than the above range, i.e. greater than 40%, then binding between the resin particles in the cured material will become weak, and hence the strength of the cured material will down, which is undesirable. On the other hand, if the mixing proportion of the water is less than the above range, i.e. less than 10% by weight, then the type of the aqueous dispersion will become W/O, and hence a stable O/W type aqueous dispersion, which is an object of the present invention, will not be obtained.

As described above, the O/W type aqueous dispersion of the present invention can easily be obtained by mixing together a liquid radical polymerization type thermosetting resin and water using mechanical mixing means; when preparing the O/W type aqueous dispersion of the present invention, it is necessary to mix the liquid resin and the water together thoroughly, and hence in the case of carrying out the mixing using, for example, a dissolver (a high-speed rotating mixer) or a homomixer, one having stirring blades of a structure enabling the liquid resin and the water to be mixed together thoroughly is used, and the mixing is carried out by stirring for 1 to 20 minutes at 2000 to 8000 rpm. By carrying out the mixing under such conditions, an aqueous dispersion in which fine resin particles are dispersed uniformly in an aqueous phase in a state surrounded by water, and which has good stability and viscosity and exhibits thixotropy can be obtained. It can easily be judged when the mixing has been completed by visually observing the state of the viscosity and thixotropy of the dispersion while carrying out the mixing under the above conditions. If the mixing is insufficient, then it will not be possible to obtain a good aqueous dispersion: the aqueous dispersion obtained will have low viscosity and poor stability, with separation occurring within a short time.

The O/W type aqueous dispersion of the present invention is an O/W type aqueous dispersion in which fine spherical resin particles having a particle diameter of 10 μm or less are uniformly dispersed in an aqueous phase in a state covered by water; it is a stable aqueous dispersion that has a suitable viscosity, and exhibits thixotropy, with the viscosity at ambient temperature (25° C.) being 1 to 20 poise at 60 rpm and 10 to 100 poise at 6 rpm when using a B-type viscometer (Brookfield viscometer) with a No. 4 rotor, and hence the degree of thixotropy (value at 6 rpm/value at 60 rpm) being 3 to 10.

The O/W type aqueous dispersion of the present invention is a stable dispersion in the form in which fine resin particles are uniformly dispersed in an aqueous phase in a state covered by water as described above, but it is conjectured that during the process of curing the aqueous dispersion, at the gel stage the stable dispersion state of the resin particles breaks down due to a change in polarity and heat generation accompanying the curing reaction, slight pressure from the external environment and so on, and the fine particles in the gel state come into contact with one another, chemical reaction occurs at the contact surfaces, the particles bind together, binding of the system as a whole occurs, and a cured material having a strength sufficient to withstand practical use is obtained. In such a cured material, a particle aggregate is formed in which fine spherical resin particles from the aqueous dispersion are bound together in particle form, and the cured material has a continuous aqueous phase; by removing water from the cured material and carrying out drying, a porous cured material is obtained in which voids between the fine particles form interconnected pores.

Regarding the cured material obtained from the O/W type aqueous dispersion of the present invention which comprises such fine particles, a porous cured material is obtained that has fine interconnected pores having an effective pore diameter controlled to be 0.1 to 1.0 μm, and has a porosity of 10 to 40 vol %.

The O/W type aqueous dispersion of the present invention is used with a curing agent and if necessary an accelerator added thereto, and it is preferable to prepare the O/W type aqueous dispersion by adding the accelerator that is added if necessary to the liquid thermosetting resin in advance. The curing agent is generally added when the O/W type aqueous dispersion is used. In the case that the curing agent is a powder or a paste and hence it takes time to dissolve the curing agent uniformly in the resin, it is preferable to prepare the O/W type aqueous dispersion by adding the curing agent to the liquid thermosetting resin in advance. In this case, the accelerator that is added if necessary is added when the O/W type aqueous dispersion is used.

A normal organic peroxide is used as the curing agent used in the present invention. Examples include ketone peroxides such as methyl ethyl ketone peroxide, peroxyketals such as 1,1-bis(t-hexylperoxy)-3,3,5-trimethylcyclohexane, hydroperoxides such as cumene hydroperoxide, dialkyl peroxides such as dicumyl peroxide, diacyl peroxides such as benzoyl peroxide, peroxydicarbonates such as bis(4-t-butylcyclohexyl)peroxydicarbonate, peroxybenzoates such as t-butyl peroxybenzoate, and so on. The curing agent is generally used in a range of 0.5 to 3.0 parts by weight, preferably 0.5 to 2.0 parts by weight, per 100 parts by weight of the liquid radical polymerization type thermosetting resin.

Regarding the above-mentioned accelerator, an accelerator commonly used in the room-temperature curing of unsaturated polyester resins is used, for example a metal salt of an organic acid (a metallic soap) such as cobalt naphthenate, a tertiary amine such as N,N-dimethylaniline or N,N-dimethyl-para-toluidine, or ferrocene. Regarding these accelerators, in the case that a ketone peroxide or a hydroperoxide is used as the curing agent, combination with a metallic soap such as cobalt naphthenate is preferable, in the case that the curing agent is a diacyl peroxide, combination with a tertiary amine is preferable, and in the case that the curing agent is a peroxycarbonate, combination with ferrocene is preferable. Regarding these accelerators, a metallic soap is used in a range of 0.02 to 2.0 parts by weight, preferably 0.2 to 1.0 parts by weight, converting to one having a metal content of 6%, per 100 parts by weight of the liquid radical polymerization type thermosetting resin. A tertiary amine is used in a range of 0.05 to 1.0 parts by weight, preferably 0.1 to 0.5 parts by weight, per 100 parts by weight of the liquid radical polymerization type thermosetting resin.

When preparing the O/W type aqueous dispersion of the present invention, a surfactant can be used if necessary. Using a surfactant enables the stability of the O/W type aqueous dispersion to be raised, and hence in the case that the aqueous dispersion of the present invention is not used immediately after preparation but rather is made into the cured material only after leaving for a few days, it is preferable to add a surfactant.

A nonionic surfactant is preferable as the surfactant used in the present invention. Any of the following types of nonionic surfactant can be used: (1) ester type, (2) ether type, (3) alkylphenol type, (4) sorbitan ester type, (5) polyoxyethylene sorbitan ester type, and (6) special nonionic type. Regarding the amount added of the surfactant, the surfactant is used in a range of 0.1 to 10 parts by weight, preferably 0.5 to 2.0 parts by weight, per 100 parts by weight of the liquid radical polymerization type thermosetting resin. If the amount added of the surfactant is less than 0.1 parts by weight, then adding the surfactant will have no effect, whereas it is undesirable for an amount exceeding 10 parts by weight to be added, since then there will be a risk of the water resistance dropping.

The FRP precision filter medium of the present invention can easily be obtained by curing, at ambient temperature or with heating, in the presence of a reinforcing material, an O/W type aqueous dispersion as described above that has been made by mixing a liquid radical polymerization type thermosetting resin and water together to uniformly disperse particles of the resin in the aqueous phase.

That is, by curing, at ambient temperature or with heating, in the presence of a reinforcing material, an O/W type aqueous dispersion that has been made by uniformly dispersing resin particles in an aqueous phase as described above, the resin particles are cured in a state in which the aqueous dispersion is impregnated into the reinforcing material, thus obtaining a cured material containing the reinforcing material in which fine resin particles are bound together; by removing water from and drying the cured material, a porous cured material is obtained that is reinforced by the reinforcing material and in which the voids between the fine particles form interconnected pores. The porous cured material has fine interconnected pores having an effective pore diameter of 0.1 $\mu$m to 1.0 $\mu$m and a porosity of 10 to 40 vol %. It can be filtrated to separate away bacteria or the like having a size of 1 $\mu$m or more, and is useful, for example, as a filter medium for sewage treatment or the like; moreover, it is an FRP precision filter medium that is low in cost, that is light and durable, and for which there is a high degree of freedom to select the shape.

A reinforcing material for giving strength, durability and so on is used in the FRP precision filter medium of the present invention; here, examples of the reinforcing material used include a glass cloth, a carbon cloth, a glass chopped strand mat, synthetic fiber cloths of aramid fibers, polyester fibers, acrylic fibers, polypropylene fibers or the like, or nonwoven fabrics of such synthetic fibers, a rayon type nonwoven fabric, and so on. The reinforcing material is generally used in a range from 100 parts by weight to 1 part by weight, preferably from 50 parts by weight to 5 parts by weight, per 100 parts by weight of the O/W type aqueous dispersion. When molding the FRP precision filter medium of the present invention, a mold release agent is applied onto the mold; it is preferable to use a hydrophilic polyvinyl alcohol, a soap or a surfactant (neutral detergent), or else a water-repellent plastic such as polyethylene, polyvinyl chloride or nylon as the mold release agent.

In the present invention, regarding the method of molding the FRP precision filter medium, the O/W type aqueous dispersion used gives virtually no unpleasant styrene odor, has a suitable viscosity, and is easy to handle, and a fiber-reinforced FRP precision filter medium can easily be molded using a hand lay-up method or a spray up method, which are known as methods of molding unsaturated polyester resins; it is, however, also possible to carry out the molding using any of various other methods that have been known from hitherto. For example, with the hand lay-up method or the spray up method, only a planar FRP precision filter medium can be molded, but if a resin injection method is used, then a tubular or box-shaped molded article can be molded, and moreover a multi-stage laminated cell can be molded.

Next, the present invention will be described more specifically through examples; however, the present invention is not limited to these examples.

(Preparation of O/W Type Aqueous Thermosetting Resin Dispersion)

EXAMPLE 1

3000 g of a liquid epoxy acrylate resin (made by Japan U-PICA Co., Ltd., trade name 'Neopol 8250' (specific gravity 1.06)) was weighed out into a metal vessel of inside diameter 10 cm and height 20 cm, 60 g of commercially sold 50 wt % benzoyl peroxide (net amount 1g per 100 g of the resin) as a curing agent, and 30 g of polyoxyethylene sorbitan monolaurate as a surfactant were added thereto, and mixing was carried out well with gentle stirring; 1000 g of tap water (25 g per 75 g of the resin) was then added, and high speed stirring was carried out for 15 minutes at 2000 rpm using a dissolver having blades of outside diameter 8 cm, thus obtaining an O/W type aqueous dispersion. The aqueous dispersion obtained was a stable, thixotropic O/W type aqueous dispersion: fine resin particles of average size about 4 $\mu$m were uniformly dispersed in an aqueous phase, and the viscosity using a B-type viscometer (Brookfield viscometer) with a No. 4 rotor was 9 poise at 60 rpm, and 40 poise at 6 rpm. Moreover, the O/W type aqueous dispersion was left for 30 days at ambient temperature, but separation did not occur.

EXAMPLE 2

3000 g of a liquid unsaturated polyester resin (made by Japan U-PICA Co., Ltd., trade name 'U-PICA 6510') (specific gravity 1.10) was weighed out into a metal vessel of inside diameter 20 cm and height 30 cm, 60 g of commercially sold 50 wt % benzoyl peroxide (net amount 1 g per 10 g of the resin) as a curing agent, and 30 g of 'Pluronic L-61' (polyoxyethylene polyoxypropylene ether type surfactant, made by Asahi Denka Kogyo K.K.) as a surfactant were added thereto, and mixing was carried out well with gentle stirring; 1615 g of tap water (35 g per 65 g of the resin) was then added, and high-speed stirring was carried out for 8 minutes at 3000 rpm using a dissolver having blades of outside diameter 6 cm, thus obtaining an O/W type aqueous dispersion. The aqueous dispersion obtained was a stable, thixotropic O/W type aqueous dispersion: fine resin particles of average size about 3 $\mu$m were uniformly dispersed in an aqueous phase, and the viscosity using a B-type viscometer (Brookfield viscometer) with a No. 4 rotor was 11 poise at 60 rpm, and 70 poise at 6 rpm. The O/W type aqueous dispersion was left for 30 days at ambient temperature, but separation did not occur.

EXAMPLE 3

1000 g of a liquid urethane acrylate resin (made by Japan U-PICA Co., Ltd., trade name 'U-PICA 8921' (specific gravity 1.08)) was weighed out into a metal vessel of inside diameter 15 cm and height 20 cm, 20 g of commercially sold 50 wt % benzoyl peroxide (net amount 1 g per 10 g of the resin) as a curing agent was added thereto, and mixing was carried out thoroughly with gentle stirring; 333 g of distilled water (25 g per 75 g of the resin) was then added, and high speed stirring was carried out for 5 minutes at 5000 rpm using a dissolver having blades of outside diameter 4 cm, thus obtaining an O/W type aqueous dispersion. The aqueous dispersion obtained was a stable, thixotropic O/W type aqueous dispersion: fine resin particles of average size about 3 $\mu$m were uniformly dispersed in an aqueous phase, and the viscosity using a B-type viscometer (Brookfield viscometer) with a No. 4 rotor was 8 poise at 60 rpm, and 65 poise at 6 rpm. The O/W type aqueous dispersion was left for 30 days at ambient temperature, but separation did not occur.

EXAMPLE 4

200 g of a liquid unsaturated polyester resin (made by Japan U-PICA Co., Ltd., trade name 'U-PICA 6510' (specific gravity 1.10)) was weighed out into a metal vessel of inside diameter 10 cm and height 15 cm, 2 g of commercially sold 'Percadox 16' (trade name) Cmade by Nippon Kayaku Co., Ltd., chemical name: bis(4-t-butylcyclohexyl)peroxydicarbonate) (net amount 1 g per 100 g of the resin) as a curing agent, and 'Nonion HS-206' (polyoxyethylene octylphenol ether type surfactant, made by NOF Corporation) as a surfactant were added thereto, and mixing was carried out thoroughly with gentle stirring; 110 g of distilled water (35 g per 65 g of the resin) was then added, and high speed stirring was carried out for 5 minutes at 5000 rpm using a dissolver having blades of outside diameter 4 cm, thus obtaining an O/W type aqueous dispersion. The aqueous dispersion obtained was a stable, thixotropic O/W type aqueous dispersion: fine resin particles of average size about 3 $\mu$m were uniformly dispersed in an aqueous phase, and the viscosity using a B-type viscometer (Brookfield viscometer) with a No. 4 rotor was 12 poise at 60 rpm, and 77 poise at 6 rpm. The O/W type aqueous dispersion was left for 30 days at ambient temperature, but separation did not occur.

EXAMPLE 5

10 kg of a liquid unsaturated polyester resin (made by Japan U-PICA Co., Ltd., trade name 'U-PICA 6510' (specific gravity 1.10)) was weighed out into a metal vessel of inside diameter 35 cm and height 40 cm, 100 g of commercially sold 'Permek N' (trade name) (55 wt % methyl ethyl ketone peroxide, made by NOF Corporation) (net amount 1 g per 100 g of the resin) as a curing agent, and 100 g of 'Pluronic L-61' (trade name) (polyoxyethylene polyoxypropylene ether type surfactant, made by Asahi Denka Kogyo K.K.) as a surfactant were added thereto, and mixing was carried out well with gentle stirring; 4.3 kg of tap water (30 g per 70 g of the resin) was then added, and high-speed stirring was carried out for 10 minutes at 2000 rpm using a dissolver having blades of outside diameter 12 cm, thus obtaining an O/W type aqueous dispersion. The aqueous dispersion obtained was a stable, thixotropic O/W type aqueous dispersion: fine resin particles of average size about 4 $\mu$m were uniformly dispersed in an aqueous phase, and the viscosity using a B-type viscometer (Brookfield viscometer) with a No. 4 rotor was 10 poise at 60 rpm, and 58 poise at 6 rpm. The O/W type aqueous dispersion was left for 30 days at ambient temperature, but separation did not occur.

EXAMPLE 6

1000 g of a liquid unsaturated polyester resin (made by Japan U-PICA Co., Ltd., trade name 'U-PICA 6510' (specific gravity 1.10)) was weighed out into a metal vessel of inside diameter 10 cm and height 15 cm, 20 g of commercially sold 50 wt % benzoyl peroxide (net amount 1 g per 100 g of the resin) as a curing agent, and 10 g of 'Pluronic L-61' (trade name) (polyoxyethylene polyoxypropylene ether type surfactant, made by Asahi Denka Kogyo K.K.) as a surfactant were added thereto, and mixing was carried out well with gentle stirring; 190 g of tap water (15 g per 85 g of the resin) was then added, and high-speed stirring was carried out for 4 minutes at 4000 rpm using a dissolver having blades of outside diameter 4 cm, thus obtaining an O/W type aqueous dispersion. The aqueous dispersion obtained was a stable, thixotropic O/W type aqueous dispersion: fine resin particles of average size about 3 $\mu$m were uniformly dispersed in an aqueous phase, and the viscosity using a B-type viscometer (Brookfield viscometer) with a No. 4 rotor was 10 poise at 60 rpm, and 62 poise at 6 rpm. The O/W type aqueous dispersion was left for 30 days at ambient temperature, but separation did not occur.

COMPARATIVE EXAMPLE 1

500 g of a liquid unsaturated polyester resin (made by Japan U-PICA Co., Ltd., trade name 'U-PICA 6510' (specific gravity 1.10)) was weighed out into a metal vessel of inside diameter 10 cm and height 15 cm, 10 g of 'Pluronic L-61' (trade name) (polyoxyethylene polyoxypropylene ether type surfactant, made by Asahi Denka Kogyo K.K.) as a surfactant was added thereto, and mixing was carried out well with gentle stirring; 500 g of tap water (50 g per 50 g of the resin) was then added, and high-speed stirring was carried out for 4 minutes at 4000 rpm using a dissolver having blades of outside diameter 4 cm, thus obtaining an aqueous dispersion. The aqueous dispersion obtained was an O/W type aqueous dispersion in which fine resin particles of average size about 3 $\mu$m were uniformly dispersed in an aqueous phase, but the thixotropy was poor, with the viscosity using a B-type viscometer (Brookfield viscometer) with a No. 4 rotor being 30 centipoise at 60 rpm, and 32 centipoise at 6 rpm. The aqueous dispersion was left at ambient temperature, whereupon separation occurred in 10 minutes, and hence stability was completely lacking.

COMPARATIVE EXAMPLE 2

4000 g of a liquid unsaturated polyester resin (made by Japan U-PICA, Co., Ltd., trade name 'U-PICA 510' (specific gravity 1.10)) was weighed out into a metal vessel of inside diameter 20 cm and height 30 cm, 80 g of commercially sold 50 wt % benzoyl peroxide (net amount 1 g per 100 g of the resin) as a curing agent, and 40 g of 'Pluronic L-61' (trade name) (polyoxyethylene polyoxypropylene ether type surfactant, made by Asahi Denka Kogyo K.K.) as a surfactant were added thereto, and mixing was carried out well with gentle stirring; 350 g of tap water (8 g per 92 g of the resin) was then added, and high-speed stirring was carried out for 8 minutes at 3000 rpm using a dissolver having blades of outside diameter 8 cm, thus obtaining an aqueous dispersion. The aqueous dispersion obtained was an aqueous dispersion in which fine resin particles were uniformly dispersed, but was of W/O type.

(Preparation of Cured Material)

EXAMPLE 7

6 g of N,N-dimethylaniline was added to the O/W type aqueous dispersion obtained in Example 1 and was dissolved thoroughly; the aqueous dispersion was then poured into a container of width 50 mm, length 200 mm and depth 100 mm, the liquid surface was covered with cellophane paper and polyester film, and the aqueous dispersion was left at ambient temperature for 24 hours, thus carrying out curing. After the curing, the cellophane paper and the polyester film were taken off, water was removed, and drying was carried out by leaving at ambient temperature for 24 hours, thus obtaining a block-shaped porous cured material. The cured material obtained had a porosity of about 27 vol % and an effective pore diameter of 0.5 $\mu$m.

EXAMPLE 8

6 g of N,N-dimethylaniline was added to the O/W type aqueous dispersion obtained in Example 2 and was dissolved thoroughly, the aqueous dispersion was then impregnated into 3 plies of a 450 g/m² glass chopped strand mat on a mold that had had a hydrophilic soap applied thereto as a mold release agent, and then the glass mat that had been impregnated with the aqueous dispersion was covered with cellophane paper and polyester film, and left at ambient temperature for 24 hours, thus carrying out curing. After the curing, the cellophane paper and the polyester film were taken off, and drying was carried out by leaving at ambient temperature for 24 hours, thus obtaining a glass-fiber-reinforced porous cured material of thickness 3 mm. The cured material obtained had a porosity of about 30 vol % and an effective pore diameter of 0.5 $\mu$m.

EXAMPLE 9

50 g of cobalt naphthenate (metallic cobalt content 6 wt %, made by Nihon Kagaku Sangyo Co., Ltd.) was added to the O/W type aqueous dispersion obtained in Example 5 and was dissolved thoroughly; the aqueous dispersion was then poured into a container of width 100 mm, length 500 mm and depth 300 mm, the liquid surface was covered with cellophane paper and polyester film, and the aqueous dispersion was left at ambient temperature for 24 hours, thus carrying out curing. After the curing, the cellophane paper and the polyester film were taken off, and drying was carried out by leaving at ambient temperature for 24 hours, thus obtaining a block-shaped cured material. The cured material had a porosity of about 31 vol % and an effective pore diameter of 0.45 $\mu$m.

EXAMPLE 10

500 g of a liquid unsaturated polyester resin (made by Japan U-PICA Co., Ltd., trade name 'U-PICA 6502;') (specific gravity 1.10)) was weighed out into a metal vessel of inside diameter 20 cm and height 30 cm, 10 g of commercially sold 50 wt % benzoyl peroxide (net amount 1 g per 100 g of the resin) as a curing agent, and 5 g of 'Pluronic L-61' (polyoxyethylene polyoxypropylene ether type surfactant, made by Asahi Denka Kogyo K.K.) as a surfactant were added thereto, and mixing was carried out well with gentle stirring; 167 g of tap water (25 g per 75 g of the resin) was then added, and high-speed stirring was carried out for 5 minutes at 5000 rpm using a dissolver having blades of outside diameter 4 cm, thus obtaining an O/W type aqueous dispersion. When using a B-type viscometer (Brookfield viscometer) with a No. 4 rotor, the viscosity of the aqueous dispersion obtained was 9 poise at 60 rpm, and 60 poise at 6 rpm.

Next, 1 g of N,N-dimethylaniline was added to the O/W type aqueous dispersion obtained and was dissolved thoroughly, the aqueous dispersion was then impregnated into 3 plies of a 450 g/m$^2$ glass chopped strand mat on a mold that had had a hydrophilic soap applied thereto as a mold release agent, and then the glass mat that had been impregnated with the aqueous dispersion was covered with cellophane paper and polyester film, and left at 80° C. for 1 hour, thus carrying out curing. After the curing, the cellophane paper and the polyester film were taken off, and drying was carried out at 80° C. for 30 minutes, thus obtaining a glass-fiber-reinforced porous cured material of thickness 3 mm. The cured material obtained had a porosity of about 19 vol % and an effective pore diameter of 0.5 $\mu$m, and thus possessed the properties of an FRP precision filter medium.

EXAMPLE 11

200 g of a liquid unsaturated polyester resin (made by Japan U-PICA Co., Ltd., trade name 'U-PICA 6510' (specific gravity 1.10)) was weighed out into a metal vessel of inside diameter 10 cm and height 15 cm, 2 g of commercially sold 'Percadox 16' (chemical name: bis (4-t-butylcyclohexyl)peroxydicarbonate, made by Nippon Kayaku Co., Ltd.) (net amount 1 g per 100 g of the resin) as a curing agent and 'Nonion HS-206' (polyoxyethylene octylphenol ether type surfactant, made by NOF Corporation) as a surfactant were added thereto, and mixing was carried out thoroughly with gentle stirring; 86 g of distilled water (30 g per 70 g of the resin) was then added, and high-speed stirring was carried out for 8 minutes at 2000 rpm using a dissolver having blades of outside diameter 4 cm, thus obtaining an O/W type aqueous dispersion. When using a B-type viscometer (Brookfield viscometer) with a No. 4 rotor, the viscosity of the aqueous dispersion obtained was 10 poise at 60 rpm, and 62 poise at 6 rpm.

Next, 4 g of a solution of 10 wt % ferrocene in styrene was added to the O/W type aqueous dispersion obtained and was dissolved thoroughly, the aqueous dispersion was then impregnated into an OL-40 polyester nonwoven fabric (made by Japan Vilene Co., Ltd., thickness 0.12 mm, 42 g/m$^2$) on a mold that had had a hydrophilic soap applied thereto as a mold release agent, and then the polyester nonwoven fabric that had been impregnated with the aqueous dispersion was covered with cellophane paper and polyester film, and left at ambient temperature for 24 hours, thus carrying out curing. After the curing, the cellophane paper and the polyester film were taken off, and drying was carried out by leaving at ambient temperature for 24 hours, thus obtaining a fiber-reinforced cured material of thickness 0.2 mm. The cured material obtained had a porosity of about 25 vol % and an effective pore diameter of 0.4 $\mu$m, and thus possessed the properties of an FRP precision filter medium.

EXAMPLE 12

1000 g of a liquid unsaturated polyester resin (made by Japan U-PICA Co., Ltd., trade name 'U-PICA 6510' (specific gravity 1.10)) was weighed out into a metal vessel of inside diameter 20 cm and height 30 cm, 20 g of commercially sold 50 wt % benzoyl peroxide (net amount 1 g per 100 g of the resin) as a curing agent, and 10 g of 'Pluronic L-61' (polyoxyethylene polyoxypropylene ether type surfactant, made by Asahi Denka Kogyo K.K.) as a surfactant were added thereto, and mixing was carried out well with gentle stirring; 540 g of tap water (35 g per 65 g of the resin) was then added, and high-speed stirring was carried out for 5 minutes at 5000 rpm using a dissolver having blades of outside diameter 6 cm, thus obtaining an O/W type aqueous dispersion. When using a B-type viscometer (Brookfield viscometer) with a No. 4 rotor, the viscosity of the aqueous dispersion obtained was 7 poise at 60 rpm, and 40 poise at 6 rpm.

Next, 2 g of N,N-dimethylaniline was added to the O/W type aqueous dispersion obtained and was dissolved thoroughly, a 450 g/m$^2$ glass chopped strand mat and a polyester nonwoven fabric were set in a mold that had had a hydrophilic soap applied thereto as a mold release agent. The mold which was kept at 60° C. was depressurized from one side, and the aqueous dispersion was injected in from the other side, and after the injection had been completed the state was maintained for 5 minutes, and then removing a cured material from the mold; drying was then carried out by leaving at ambient temperature for 24 hours, thus obtaining a fiber-reinforced porous cured material of thickness 2 mm. The cured material obtained had a porosity of about 26 vol % and an effective pore diameter of 0.4 $\mu$m, and thus possessed properties befitting an FRP precision filter medium.

EXAMPLE 13

(Synthesis of Unsaturated Polyester Resin Using Pulverized Recovered PET Bottles)

1750 g of a material made by pulverizing recovered PET bottles and 2150 g of dipropylene glycol were put into a 5-liter glass 5-mouth flask equipped with a stirrer, a thermometer, a reflux condenser tube and a nitrogen-gas-introducing tube, 0.1 g of dibutyltin oxide was added as a catalyst, and the material made by pulverizing recovered PET bottles was decomposed at 230° C., with 2 hours being required. Cooling down to 120° C. was then carried out, and then 1350 g of maleic anhydride was added, and an unsaturated polyester of acid value 9 mgKOH/g and hydroxyl value 32 mgKOH/g was obtained, with this taking 7 hours at 210° C. The unsaturated polyester obtained was dissolved in 4100 g of styrene in which had been dissolved 1 g of hydroquinone, thus obtaining 9100 g of an unsaturated polyester resin made using recovered PET as a raw material.
(Manufacture of aqueous dispersion)

500 g of the liquid unsaturated polyester resin obtained as described above was weighed out into a metal vessel of inside diameter 10 cm and height 15 cm, 10 g of commercially sold 50 wt % benzoyl peroxide (net amount 1 g per 100 g of the resin) as a curing agent, and 5 g of 'Pluronic L-61' (polyoxyethylene polyoxypropylene ether type surfactant, made by Asahi Denka Kogyc K.K.) as a surfactant were added thereto, and mixing was carried out well with gentle stirring; 167 g of tap water (25 g per 75 g of the resin) was then added, and high-speed stirring was carried out for 2 minutes at 5000 rpm using a dissolver having blades of outside diameter 4 cm, thus obtaining an O/W type aqueous dispersion. When using a B-type viscometer (Brookfield viscometer) with a No. 4 rotor, the viscosity of the aqueous dispersion obtained was 13 poise at 60 rpm, and 85 poise at 6 rpm.
(Manufacture of FRP Filter Medium)

1 g of N,N-dimethylaniline was added to the above-mentioned O/W type aqueous dispersion and was dissolved thoroughly, the aqueous dispersion was then impregnated into 2 plies of a 230 g/m² glass chopped strand mat on a glass plate that had had a metallic soap applied thereto as a mold release agent, and then the glass mat that had been impregnated with the aqueous dispersion was covered with nylon film to prevent evaporation of water, and was left at ambient temperature for 24 hours, thus carrying out curing. After the curing, the nylon film was taken off, and drying was carried out by leaving at ambient temperature for 24 hours, thus obtaining a glass-fiber-reinforced porous cured material of thickness 1.2 mm. The cured material obtained had a porosity of about 18 vol % and an effective pore diameter of 0.5 µm, and thus possessed properties similar to those of the FRP filter medium of Example 10.

EXAMPLE 14

1000 g of an epoxy acrylate resin ('Neopol 8250H' made by Japan U-PICA Co., Ltd. (specific gravity 1.06)) was weighed out into a metal vessel of inside diameter 15 cm and height 20 cm, 20 g of commercially sold 50 wt % benzoyl peroxide (net amount 1 g per 10 g of the resin) as a curing agent, and log of 'Pluronic L-61' as a surfactant were added thereto, and mixing was carried out well with gentle stirring; 429 g of tap water (30 g per 70 g of the resin) was then added, and high-speed stirring was carried out for 4 minutes at 500 rpm using a dissolver having blades of outside diameter 4 cm, thus obtaining an O/W type aqueous dispersion.

2 g of N,N-dimethylaniline was added to the aqueous dispersion and was dissolved, the aqueous dispersion was then impregnated into 3 plies of a 230 g/m² glass chopped strand mat on a polyethylene sheet of thickness 1 mm, and then the glass mat that had been impregnated with the aqueous dispersion was covered with a polyethylene sheet of thickness 0.5 mm to prevent evaporation of water, and was left at ambient temperature for 24 hours, thus carrying out curing. After the curing, the polyethylene sheet was taken off, and drying was carried out by leaving at ambient temperature for 24 hours, thus obtaining a glass-fiber-reinforced porous cured material of thickness 1.8 mm. The cured material obtained had a porosity of about 21 vol % and an effective pore diameter of 0.5 µm, and thus possessed properties similar to those of the FRP filter medium of Example 10.

EXAMPLE 15

3000 g of a liquid unsaturated polyester resin (made by Japan U-PICA Co., Ltd., trade name 'U-PICA 6510' (specific gravity 1.10)) was weighed out into a metal vessel of inside diameter 10 cm and height 15 cm, 60 g of 'NIPER-FF' (chemical name: benzoyl peroxide, made by NOF Corporation) (net amount 1 g per 100 g of the resin) as a curing agent, and 30 g of 'NEWCOL-25' (polyoxyethylene sorbitan laurate type surfactant, made by Nippon Nyukazai Co., Ltd.) as a surfactant were added thereto, and mixing was carried out thoroughly with gentle stirring; 1000 g of distilled water (25 g per 75 g of the resin) was then added, and high-speed stirring was carried out for 6 minutes at 4000 rpm using a dissolver having blades of outside diameter 6 cm, thus obtaining an O/W type aqueous dispersion. When using a B-type viscometer (Brookfield viscometer) with a No. 4 rotor, the viscosity of the aqueous dispersion obtained was 18 poise at 60 rpm, and 91 poise at 6 rpm.

Next, 6 g of N,N-dimethylaniline was added to the O/W type aqueous dispersion obtained and was dissolved thoroughly, and the aqueous dispersion was then impregnated into 2 plies of a 300 g/m² glass chopped strand mat and 1 ply of a 42 g/m² polyester nonwoven fabric on a 1000 mm×500 mm mold made from a hard polyethylene plate. A 980 mm×490 mm×3 mm hard polyethylene plate was then wrapped up as a core material in the article that had been impregnated with the O/W type aqueous dispersion, and the resulting article including the core material was covered with a hard polyethylene sheet of thickness 1 mm to prevent evaporation of water, and was left at ambient temperature for 24 hours, thus carrying out curing. After curing, the cured article was removed from the mold, the hard polyethylene plate core material was taken out, and drying was carried out at 80° C. for 1 hour, thus obtaining a tubular shaped of 1000 mm×500 mm×9 mm comprises porous cured material has an interconnected pores, having a 980 mm×490 mm×3 mm cavity inside and an opening part on one side. The cured material obtained had a porosity of about 21 vol % and an effective pore diameter of 0.5 µm. An FRP molded article having equipped with a water inlet and outlet was fitted into the opening part of the tubular shaped, thus manufacturing a precision filtration cell. The precision filtration cell amply possessed the properties of a precision filtration film.
(Comparison of Performance of Filter Media)

The filtration performance is shown in Table 1 below for filter media obtained in the present invention and filter media that are currently sold commercially.

TABLE 1

Comparison of filtration performance

| Filter medium | Durability | Weight | Permeate flux (m/day) | Colon Bacilllus removal rate (%) | Fabrication cost |
|---|---|---|---|---|---|
| Example 10 | Good | Light | 1.0–1.5 | 99.99< | Cheap |
| Example 11 | Good | Light | 1.0–1.5 | 99.99< | Cheap |
| Example 12 | Good | Light | 1.0–1.5 | 99.99< | Cheap |
| Organic film | Somewhat inferior | Light | 0.4–0.6 | 99.99< | Expensive |
| Hollow fibers | Somewhat inferior | Light | 0.1–0.3 | 99.99< | Expensive |
| Metal film | Rusts | Light | 0.3–0.5 | 99.99< | Expensive |
| Ceramic | Good | Heavy | 0.5–0.7 | 99.99< | Expensive |

As shown in the table above, conventional filter media comprising an organic film, conventional filter media comprising hollow fibers, conventional filter media comprising a ceramic, and the filter media according to the present invention all have a colon bacillus removal rate of more than 99.99%, but filter media comprising an organic film and filter media comprising hollow fibers have a worse durability and are more expensive than the filter media comprising a cured material of the present invention. Regarding filter media comprising a ceramic, the raw material cost is low, but the fabrication cost is high, and moreover such filter media are heavy and hence handleability is poor.

In the present invention, the resin particle diameter of the O/W type aqueous thermosetting resin dispersion was determined by looking at an electron micrograph.

Moreover, the porosity and the pore diameter of the cured material were measured as follows.

(1) Porosity

The weight of the cured material is measured before and after drying, and taking the specific gravity of water to be 1.0, the difference between the values ((weight before drying)−(weight after drying)) is taken as the volume (a) of the pores. Moreover, the weight (b) of the cured material after drying and the reinforcing material content in the cured material (the weight of combustible matter (c) and the weight of combustion residue (d) by a combustion method) are determined, and the porosity (X) is determined from one of the following formulae.

If the reinforcing material is glass:

$$X(\%)=a/\{c/(\text{true specific gravity of cured material})+d/(\text{true specific gravity of glass})\}\times 100$$

If the reinforcing material is organic matter (using an approximation assuming that the true specific gravity of the organic matter is the same as that of the resin cured material):

$$X(\%)=a/\{b/(\text{true specific gravity of cured material})+a\}\times 100$$

(2) Pore Diameter

Using an 'Autopore III 9420' porosimeter made by Shimadzu Corporation, the effective pore diameter is determined from the injection pressure and the injection amount of mercury.

INDUSTRIAL APPLICABILITY (1) The O/W type aqueous thermosetting resin dispersion of the present invention is an aqueous dispersion in which fine resin particles are uniformly dispersed in a state surrounded by water, with the water forming a continuous phase (a so-called 'sea phase') and the resin particles forming a discontinuous phase (a so-called 'island phase'); it is a stable, thixotropic O/W type aqueous dispersion having good viscosity.

(2) The O/W type aqueous thermosetting resin dispersion of the present invention is an aqueous dispersion in which fine resin particles are uniformly dispersed in an aqueous phase in a state surrounded by water; vaporization of polymerizable monomers such as styrene is thus suppressed, and hence there is a marked reduction in unpleasant styrene odor during the molding process and the curing process, i.e. the molding working environment can be improved, and hence the O/W type aqueous dispersion of the present invention is excellent from the perspective of environmental health. Moreover, being an aqueous dispersion in which resin particles are dispersed in water, the O/W type aqueous dispersion of the present invention also has advantages such that washing with water is possible, with an organic solvent as conventionally not being required, and hence the working environment can be improved, and the molding work cost can be reduced.

(3) By adding a curing agent and/or an accelerator to the O/W type aqueous thermosetting resin dispersion of the present invention and carrying out curing at ambient temperature or with heating, a cured material able to withstand normal use can be obtained; the cured material obtained is a porous cured material having fine interconnected pores, and this porous cured material, if treated to increase the functionality, can be used in various applications, for example as a precision filter medium, or an absorbent/adsorbent, or as a carrier.

(4) Moreover, the FRP precision filter medium of the present invention has a lower fabrication cost than conventional filter media, has sufficient strength, is light weight, and has excellent durability, and hence a small, light filtration apparatus having a long lifetime can be provided comparatively cheaply.

What is claimed is:

1. An O/W type aqueous thermosetting resin dispersion which comprises mixing a liquid radical polymerization type thermosetting resin and water together in a weight ratio in a range of 90:10 to 60:40 to uniformly disperse particles having a particle diameter of 10 microns or less in the aqueous phase.

2. The O/W type aqueous thermosetting resin dispersion according to claim 1, wherein the liquid radical polymerization type thermosetting resin comprises at least one selected from liquid unsaturated polyester resins, liquid epoxy (meth)acrylate resins, liquid urethane (meth)acrylate resins and liquid (meth)acrylic resins.

3. The O/W type aqueous thermosetting resin dispersion according to claim 1, wherein the liquid radical polymerization type thermosetting resin is a liquid radical polymerization type thermosetting resin containing a curing agent.

4. The O/W type aqueous thermosetting resin dispersion according to claim 1, wherein the liquid radical polymerization type thermosetting resin is a liquid radical polymerization type thermosetting resin containing a curing agent and an accelerator.

5. An FRP precision filter medium, characterized by comprising a porous cured material, which is made by curing an O/W type aqueous dispersion comprising a radical polymerization type thermosetting resin in the presence of a reinforcing material, has approximately spherical fine particles bound together therein and communicating voids between the bound particles, and has fine interconnected pores having an effective pore diameter of 0.1 μm to 1.0 μm and a porosity of 10 to 40 vol %.

6. A method of manufacturing an FRP precision filter medium, characterized by comprising a porous cured material having fine interconnected pores having an effective pore diameter of 0.1 μm to 1.0 μm and a porosity of 10 to 40 vol %, which is obtained by curing, at ambient temperature or with heating, in the presence of a reinforcing material, an O/W type aqueous thermosetting resin dispersion that has been obtained by mixing a liquid radical polymerization type thermosetting resin and water together in a weight ratio in a range of 90:10 to 60:40 to uniformly disperse particles having a particle diameter of 10 microns or less of the resin in the aqueous phase, and then removing water and drying at ambient temperature or with heating.

7. The O/W type aqueous thermosetting resin dispersion according to claim 1, wherein the liquid radical polymerization type thermosetting resin is a liquid radical polymerization type thermosetting resin containing a nonionic surfactant.

8. The O/W type aqueous thermosetting resin dispersion according to claim 2, wherein the liquid radical polymerization type thermosetting resin is a liquid radical polymerization type thermosetting containing a nonionic surfactant.

* * * * *